United States Patent
Chang et al.

(10) Patent No.: US 9,088,690 B2
(45) Date of Patent: Jul. 21, 2015

(54) VIDEO CONFERENCE SYSTEM

(75) Inventors: Chia-Yuan Chang, Tao Yuan Shien (TW); Chun-Hsiung Fang, Tao Yuan Shien (TW); Chih-Yin Lin, Tao Yuan Shien (TW); Ting-Han Huang, Tao Yuan Shien (TW); Wei-Ting Kuo, Tao Yuan Shien (TW); Yu-Hsing Lin, Tao Yuan Shien (TW); Kuo-Chung Hsu, Tao Yuan Shien (TW); Chen-Hsuan Weng, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 500 days.

(21) Appl. No.: 13/557,668

(22) Filed: Jul. 25, 2012

(65) Prior Publication Data
US 2013/0113873 A1   May 9, 2013

(30) Foreign Application Priority Data
Nov. 4, 2011   (TW) .............................. 100140246 A

(51) Int. Cl.
| | |
|---|---|
| H04N 7/14 | (2006.01) |
| H04N 7/15 | (2006.01) |
| H04L 29/06 | (2006.01) |
| H04L 12/18 | (2006.01) |

(52) U.S. Cl.
CPC ............. *H04N 7/15* (2013.01); *H04L 12/1813* (2013.01); *H04L 65/4053* (2013.01); *H04L 65/602* (2013.01); *H04L 65/607* (2013.01)

(58) Field of Classification Search
CPC combination set(s) only.
See application file for complete search history.

(56) References Cited

U.S. PATENT DOCUMENTS

| | | | |
|---|---|---|---|
| 7,158,534 B2 | 1/2007 | Tam et al. | |
| 7,751,434 B2 | 7/2010 | Kasperovich | |
| 8,284,232 B2 * | 10/2012 | Biggs et al. | 348/14.08 |
| 2003/0020806 A1 * | 1/2003 | Chang et al. | 348/14.08 |
| 2008/0010362 A1 * | 1/2008 | Zhou | 709/219 |
| 2011/0115876 A1 | 5/2011 | Khot et al. | |
| 2012/0287302 A1 * | 11/2012 | Tian et al. | 348/223.1 |

FOREIGN PATENT DOCUMENTS

| | | |
|---|---|---|
| CN | 1488222 | 4/2004 |
| CN | 1992878 | 7/2007 |
| CN | 101742223 | 6/2010 |

OTHER PUBLICATIONS

Taiwanese language office action dated Feb. 10, 2014.
English language translation of abstract of CN 1488222 (published Apr. 7, 2004).
Chinese language office action dated Apr. 1, 2015, issued in application No. 201110372778.1.

* cited by examiner

*Primary Examiner* — Joseph J Nguyen
(74) *Attorney, Agent, or Firm* — McClure, Qualey & Rodack, LLP

(57) ABSTRACT

A video conference method, applied to a video conference system in a multi-way conference is provided. The video conference method includes: retrieving a first number of a plurality of terminals of the multi-way conference; determining whether at least one other terminal is requiring to join in on the multi-way conference; when the at least one other terminal is requiring to join in on the multi-way conference, increasing the first number of the terminals of the multi-way conference to a second number of the terminals; and determining a resolution of the video signal captured and transmitted by the video conference system according to the second number of the terminals. A video conference system using the video conference method, is also provided.

12 Claims, 10 Drawing Sheets

VIDEO CONFERENCE SYSTEM

CROSS REFERENCE TO RELATED APPLICATIONS

This Application claims priority of Taiwan Patent Application No. 100140246, filed on Nov. 4, 2011, the entirety of which is incorporated by reference herein.

BACKGROUND OF THE INVENTION

1. Field of the Invention

The present invention relates to video conferencing, and in particular relates to a video conference system and method which can execute a multi-way conference without an additional processor.

2. Description of the Related Art

In recent years, video conferencing has become an important way to communicate between two remote users due to the development of network technologies and video compression technologies. In addition, the coverage area of wired and wireless networks have become very wide, and thus video communications using the internet protocol (IP) network is widely used. Although video conference services are provided by 3G cellular networks (e.g. the video phone protocol 3G-324M using the communications network), the popularity thereof is mute as the coverage area is limited and communications fees for services are very expensive. Thus, video conferencing using the 3G cellular network is not popular. Generally, it is necessary for a user to own a dedicated video conference system for convenience to conduct video conferencing with other users. When users enable a multi-way conference a server is required to organize the data received from terminals of the multi-way conference and transmit the organized data to each of the terminals, which may cause inconvenience for users in some conditions.

BRIEF SUMMARY OF THE INVENTION

A detailed description is given in the following embodiments with reference to the accompanying drawings.

An exemplary embodiment provides a video conference system. The video conference system is applied to create a plurality of channels coupled to each of a plurality of terminals of a multi-way conference in a network, respectively. The video conference system includes an audio processing unit, a video processing unit, and a network processing unit. The audio processing unit is configured to encode a first audio signal to a plurality of first audio streams according to a number of the terminals of the multi-way conference. The video processing unit is configured to encode a first video signal captured by a multimedia capturing unit to a plurality of first video streams according to the number of the terminals of the multi-way conference. The network processing unit is configured to convert the plurality of first audio streams and the plurality of first video streams to a plurality of first video network packets and a plurality of first audio network packets, respectively, and transmitting the plurality of first video network packets and the plurality of first audio network packets to the plurality of terminals through the network. Additionally, when the network processing unit receives a plurality of second video network packets and a plurality of second audio network packets corresponding to the plurality of terminals through the network, the network processing unit produces a plurality of second video streams and a plurality of second audio streams according to the plurality of second video network packets and the plurality of second audio network packets, respectively, and forces the plurality of second video streams and the plurality of second audio streams to be displayed on a display apparatus and a audio apparatus simultaneously.

Another exemplary embodiment provides a video conference method. The video conference method is applied to a video conference system, wherein the video conference system is configured to create a plurality of channels coupled to each of a plurality of terminals of a multi-way conference in a network, respectively. The video conference method includes encoding a first audio signal to a plurality of first audio streams according to a number of the terminals of the multi-way conference; encoding a first video signal captured by a multimedia capturing unit to a plurality of first video streams according to the number of the terminals of the multi-way conference; converting the plurality of first audio streams and the plurality of first video streams to a plurality of first video network packets and a plurality of first audio network packets, respectively, and transmitting the plurality of first video network packets and the plurality of first audio network packets to the plurality of terminals through the network; receiving a plurality of second video network packets and a plurality of second audio network packets corresponding to the plurality of terminals; producing a plurality of second multi-way video signals and a plurality of second multi-way audio signals according to the plurality of second video network packets and the plurality of second audio network packets respectively; and forcing the plurality of second multi-way video signals and the plurality of second multi-way audio signals to be displayed on a display apparatus and a audio apparatus simultaneously.

Yet another exemplary embodiment provides a video conference method. The video conference method is applied to a video conference system in a multi-way conference. The video conference method includes retrieving a first number of a plurality of terminals of the multi-way conference; determining whether at least one other terminal is requiring to join in on the multi-way conference; when the at least one other terminal is requiring to join in on the multi-way conference, increasing the first number of the terminals of the multi-way conference to a second number of the terminals; and determining a resolution of the video signal captured and transmitted by the video conference system according to the second number of the terminals.

BRIEF DESCRIPTION OF THE DRAWINGS

The present invention can be more fully understood by retrieving the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
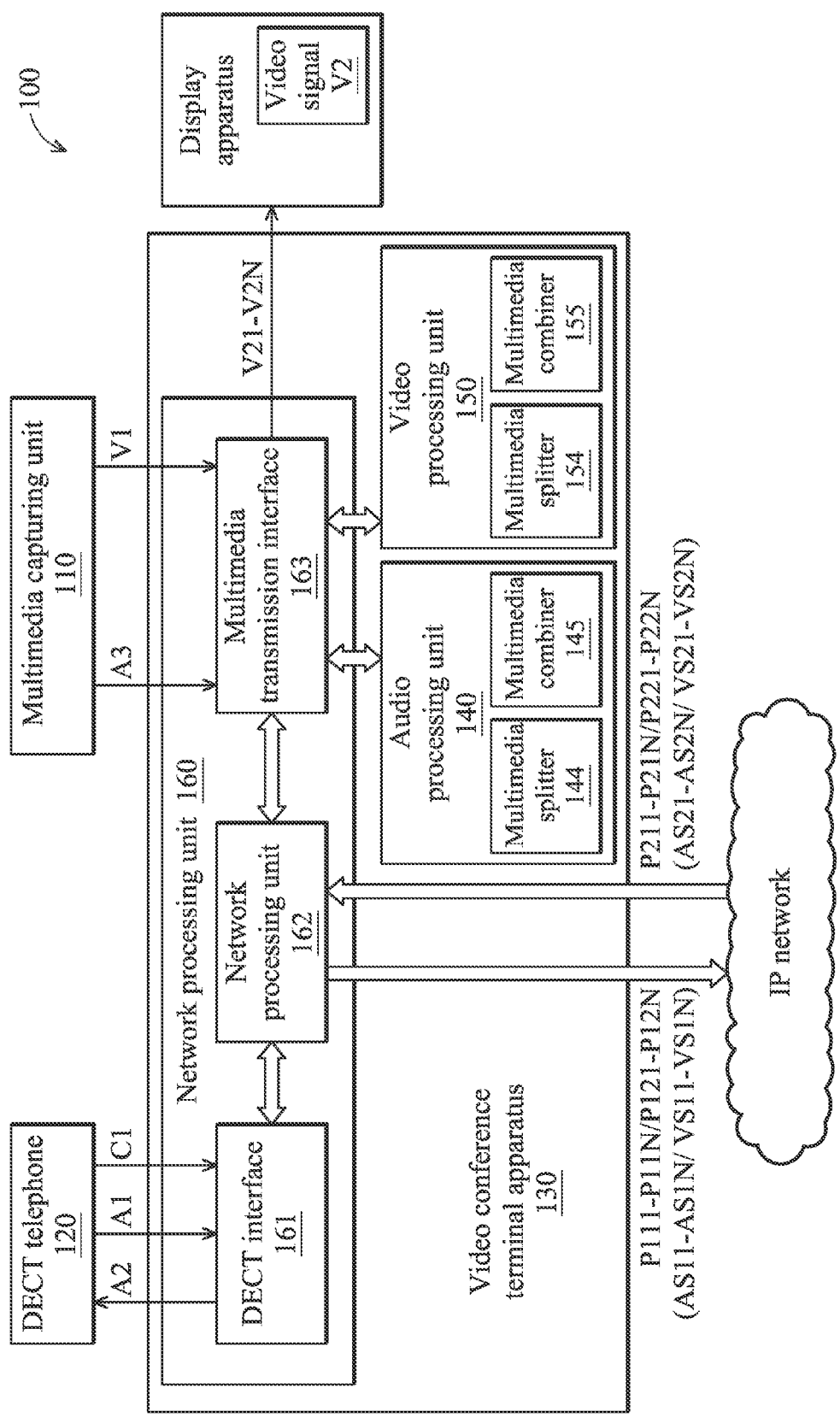
FIG. 1 illustrates a block diagram of the video conference system according to an embodiment of the invention.

FIG. 1 illustrates a block diagram of the video conference system according to an embodiment of the invention. The video conference system 100 creates a plurality of channels coupled to each of the terminals of a multi-way conference in a network, respectively, to execute the multi-way conference, wherein each of the terminals of the multi-way conference has a video conference system which is the same as the video conference system 100. The video conference system 100 may comprise a multimedia capturing unit 110, a digital enhanced cordless telecommunications telephone (DECT telephone hereafter) 120, and a video conference terminal apparatus 130. The video conference terminal apparatus 130 is configured to connect with another video conference terminal apparatus to exchange video signals and audio signals though an IP network (e.g. local area network (LAN)), a radio telecommunications network, or a public switched telephone network, and the details will be described in the following sections. The multimedia capturing unit 110 can be a light-sensitive component (e.g. a CCD or CMOS sensor), configured to receive the images of a user and output a video signal V1 according to the images. The DECT telephone 120 is configured to receive the audio signal from a remote user through the video conference terminal apparatus 130, and play the audio signal. The multimedia capturing unit 110 may further comprise a microphone (not shown in FIG. 1), configured to receive sounds from the user, transmit the sounds of the user to the video conference terminal apparatus 130, and generate a control signal C1 to control the video conference terminal apparatus, wherein the sounds are further transmitted to a remote user by the video conference terminal apparatus 130, and the details thereof will be described later. It should be noted that the DECT telephone 120 and a microphone (not shown) are the sound receiver of the video conference system 100.

The video conference terminal apparatus 130, coupled to the multimedia capturing unit 110 and the DECT telephone 120, may comprise an audio processing unit 140, a video processing unit 150, and a network processing unit 160. The audio processing unit 140 is configured to receive the audio signal A1 outputted from the DECT telephone 120 through the network processing unit 160, and encode the audio signal A1 to a plurality of audio streams AS11-AS1N. The video processing unit 150 is configured to receive the video signal V1 (and/or the audio signal A3) from the multimedia capturing unit 110 through the network processing unit 160, and encode the video signal V1 to a plurality of video streams VS11-VS1N according to the number of the terminals of the multi-way conference. For example, when the multi-way conference has three terminals, the video processing unit 150 encodes the video signal V1 to three video streams VS11-VS13 with the lower band width, such that the required band width of the video conference system 100 will not increase due to the number of terminals. For the details of the band width, reference can be made to FIG. 4.

Additionally, the audio processing unit 140 includes a multimedia splitter 144 and a multimedia combiner 145, and the video processing unit 150 includes a multimedia splitter 154 and a multimedia combiner 155. For the details of the audio processing unit 140 and the video processing unit 15, reference can be made to FIGS. 3, 4 and 5.

In another embodiment of the present invention, the multimedia capturing unit 110 and video processing unit 150 may determine the resolution of the video signal V1 and video streams VS11-VS1N according to the number of the terminals of the multi-way conference, wherein the number of the terminals is 1-N. For example, when the video conference system 100 is in a two-way conference, the resolution of the video signal V1 and the video streams VS11-VS12 may be 720 P, when the video conference system 100 is in a three-way conference, the resolution of the video signal V1 and the video streams VS11-VS13 may be VGA, and when the video conference system 100 is in a four-way conference, the resolution of the video signal V1 and the video streams VS11-VS14 may be 360 P, and so on.

The network processing unit 160 may further convert the video streams VS11-VS1N and the audio streams AS11-AS1N to a plurality of video network packets P111-P11N and audio network packets P121-P12N, and transmit the video network packets P111-P11N and audio network packets P121-P12N to another video conference terminal apparatus through an IP network for exchanging the network packets, thereby conducting a video conference. It should be noted that, in another embodiment of the present invention, the network processing unit 160 may be configured to convert the video streams VS11-VS1N and the audio streams AS11-AS1N to a plurality of network packets (not shown). Namely, the network processing unit 160 combines each of the video network packets P111-P11N with the corresponding audio network packet of the audio network packets P121-P12N in one network packet (not shown), and transmits the network packets (not shown) to another video conference terminal apparatus through the IP network for exchanging the network packets. The network processing unit 160 may comprise a digital enhanced cordless telephone interface (DECT interface hereafter) 161, a network processing unit 162, and a multimedia transmission interface 163. The DECT telephone 120 may communicate with and transmit data to the video conference terminal apparatus 130 through the DECT interface 161 with the DECT protocol. The network processing unit 162 is configured to receive the video streams VS11-VS1N and the audio streams AS11-AS1N from the video processing unit 150 and the audio processing unit 140, respectively, and encode the video streams VS11-VS1N and the audio streams AS11-AS1N to a plurality of video network packets P111-P11N and audio network packets P121-P12N, which are further transmitted to the video conference terminal apparatuses of other users in the IP network. The network processing unit 162 is compatible with various wired/wireless communications protocols, such as the local area network (LAN), the intranet, the internet, the radio telecommunications network, the public switched telephone network, Wifi, infrared ray, and Bluetooth, etc., but the invention is not limited thereto. The network processing unit 162 may further control the real-time media sessions and coordinate the network transfer flows between each user in the video conference. The multimedia transmission interface 163 is compatible with various transmission interfaces, such as USB and HDMI, for transmitting and receiving the video/audio signals.

Figure 2:
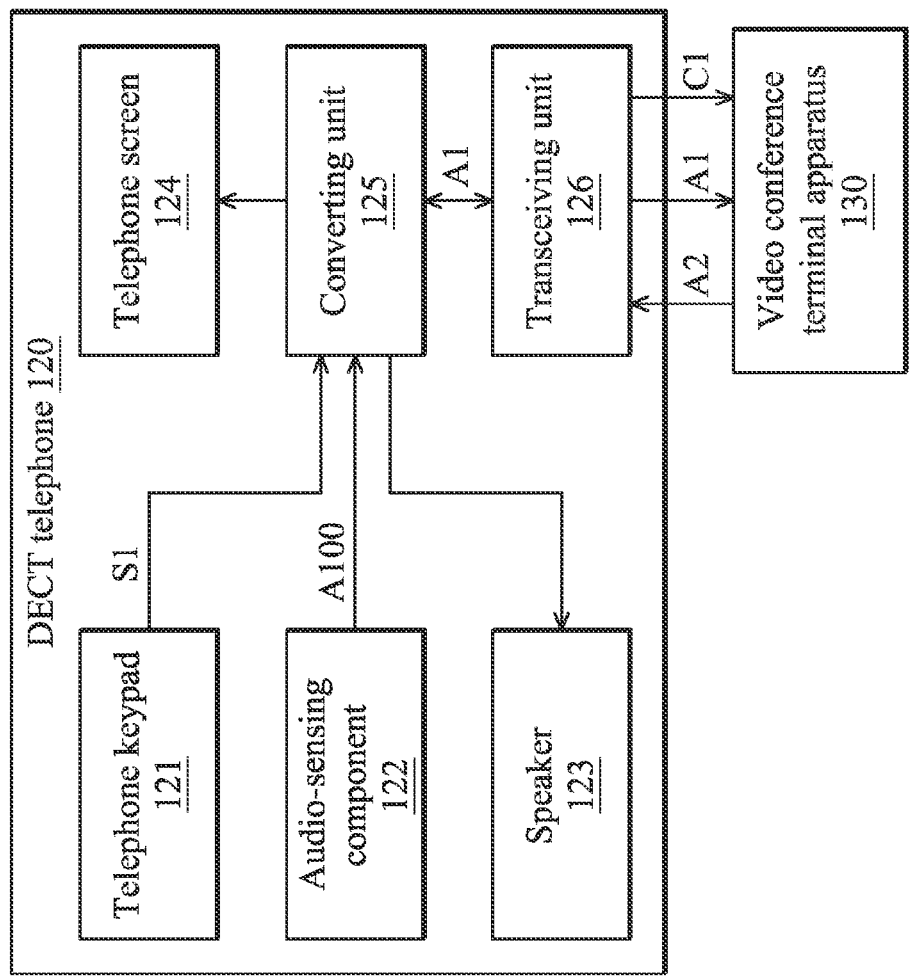
FIG. 2 illustrates a block diagram of the DECT telephone according to an embodiment of the invention.

As illustrated in FIG. 2, the DECT telephone 120 may comprise a telephone keypad 121, an audio-sensing component 122, a speaker 123, a telephone screen 124, a converting unit 125, and a transceiving unit 126. The telephone keypad 121 may comprise a numeric keypad (i.e. numpad) and telephone function buttons. A user may control the DECT telephone 120 by the telephone keypad 121, and control the video conference terminal apparatus 130 by the DECT telephone 120. For example, the user may operate the DECT telephone 120 by the telephone keypad 121, and the telephone keypad 121 may output a control signal S1 to the converting unit 125. The audio-sensing unit 122, such as a microphone, is configured to receive sounds of the user, and output an audio signal A100. The converting unit 125 is configured to receive the audio signal A100 and the control signal S1, and convert the audio signal A100 and the control signal S1 to the audio signal A1 and the control signal C1, respectively. Then, the transceiving unit 126 may transmit the audio signal A1 and the control signal C1 to the video conference terminal apparatus 130 with the DECT protocol to communicate and transfer data. In an embodiment, the DECT telephone 120 may further receive the user interface information encoded with the DECT protocol from the video conference terminal apparatus 130 through the transceiving unit 126, and display the user interface information, which is decoded by the converting unit 125, on the telephone screen 124.

Referring to FIG. 1, the audio processing unit 140 is an audio codec (i.e. audio encoder/decoder), configured to receive the audio signal A1 from the DECT telephone 120 through the DECT interface 161, and encode the received audio signal A1 to the audio streams AS11-AS1N. The audio processing unit 160 may also decode the audio streams AS21-AS2N from the other user in the video reference, transmit the audio signal A2 decoded from the audio streams AS21-AS2N to the DECT telephone 120 through the DECT interface 161, and display the audio signal A1 on the speaker 123.

The video processing unit 150 may be a video codec (i.e. video encoder/decoder), configured to receive the video signal V1 from the multimedia capturing unit 110, and encode the video signal V1 to generate a plurality of video streams VS11-VS1N. The video processing unit 150 may further transmit the video streams VS11-VS1N and the audio streams AS11-AS1N to the video conference terminal apparatus of another user in the video conference through the network processing unit 162. When the network processing unit 162 receives the network packets from the other user in the video conference through the IP network, the audio processing unit 140 and the video processing unit 150 may further decode the audio streams AS21-AS2N and the video streams VS21-VS2N in the network packet, respectively, to generate the audio signal A2 and the video signal V2, and force the audio streams AS21-AS2N and the video streams VS21-VS2N to be displayed on a display apparatus and an audio apparatus of the video conference system 100 simultaneously. For example, the audio signal A2 may be played on the DECT telephone 120, and the video signal V2 may be displayed on a display apparatus. It should be noted that, the video processing unit 150 and the audio processing unit 140 can be implemented by hardware or software. In another embodiment of the present invention, the network processing unit 162 may receive the network packets (not shown) of the other users through the IP network. The audio processing unit 140 and video processing unit 150 may decode the audio streams AS21-AS2N and the video streams VS21-VS2N of the network packets to generate the audio signal A2 and the video signal V2, respectively.

In another embodiment, the user may control the video conference terminal apparatus 130 by using the telephone keypad 121 of the DECT telephone 120, such as dialing the telephone numbers of other users in the video conference or alternating the settings of the screen. Specifically, the DECT telephone 120 may transmit the control signal to the video conference terminal apparatus 130 through the DECT interface 161 with the DECT protocol. The connection between the video conference terminal apparatus 130 and the multimedia capturing unit 110 can pass through the multimedia transmission interface 163, such as a wired interface (e.g. USB or HDMI) or a wireless interface (e.g. Wifi). The video conference terminal apparatus 130 can be connected to a display apparatus (e.g. a LCD TV) through the multimedia transmission interface 163, such as the HDMI interface or Widi (Wireless Display) interface, thereby the video screens of other users in the video conference and/or the control interface of the video conference terminal apparatus 130 can be displayed on the display apparatus, but the invention is not limited thereto.

In an embodiment, if the user A wants to conduct a video conference with the user B, the user A may use the DECT telephone 120 of the video conference terminal apparatus 130 to dial the telephone number of the video conference terminal apparatus 130 of the user B. Meanwhile, the video conference terminal apparatus 130 of the user A may receive the control message from the DECT telephone 120 through the DECT interface 161, and transmit the control message to the user B. When the video conference terminal apparatus 130 of the user B receives the phone call from the user A, the user B may respond to the phone call. Meanwhile, a video call can be built between the users A and B through the respective video conference terminal apparatus 130. The user A may use the DECT telephone 120 to receive the sounds thereof, and use the multimedia capturing unit 110 to capture the images thereof. Then, the audio processing unit 140 may receive the received sounds of the user A through the DECT interface 161, and encode the received sounds (i.e. the audio signal A1) to an audio stream AS11. The video processing unit 150 may encode the captured images of the user A (i.e. the video signal V1) to the video stream VS11. The audio stream AS11 and the video stream VS11 is transmitted to the video conference terminal apparatus 130 of the user B through the video conference terminal apparatus of the user B. On the other hand, the video conference terminal apparatus of the user B may decode the received audio stream AS11 and the video stream VS11. Then, the user B may transmit the audio signal A1 decoded from the audio stream AS11 to the DECT telephone 120 through the DECT interface 161, thereby playing the audio signal A1. The user B may also display the video signal V1 decoded from the video stream VS11 on a display apparatus through the multimedia transmission interface 163 of the video conference terminal apparatus 130. It should be noted that the user B may also use the same procedure performed by the user A for exchanging video/audio signals to conduct the video conference.

In yet another embodiment, the multimedia capturing unit 110 may further comprise a microphone (not shown in FIG. 1) for receiving the sounds of the user, and outputting an output signal A3 according to the received sounds. For example, referring to the procedure of the aforementioned embodiment, the user A may use the DECT telephone 120 or the microphone of the multimedia capturing unit 110 to receive the sounds thereof. The encoding process and transmission process of the audio/video signals is the same as those of the aforementioned embodiment. Then, the video conference terminal apparatus 130 of the user B may receive the audio stream AS11 and the video stream VS11 from the user A, which are decoded to generate the audio signal A1 and the video signal V1, respectively. The video conference terminal apparatus 130 of the user B may further transmit the audio signal A1 and the video signal V1 after the decoding process to a display apparatus (e.g. a LCD TV) through the multimedia transmission interface 163 (e.g. HDMI), thereby displaying the audio signal A1 and the video signal V1. Thus, the user B may hear the sounds of the user A and view the images of the user A on the display apparatus.

Figure 3:
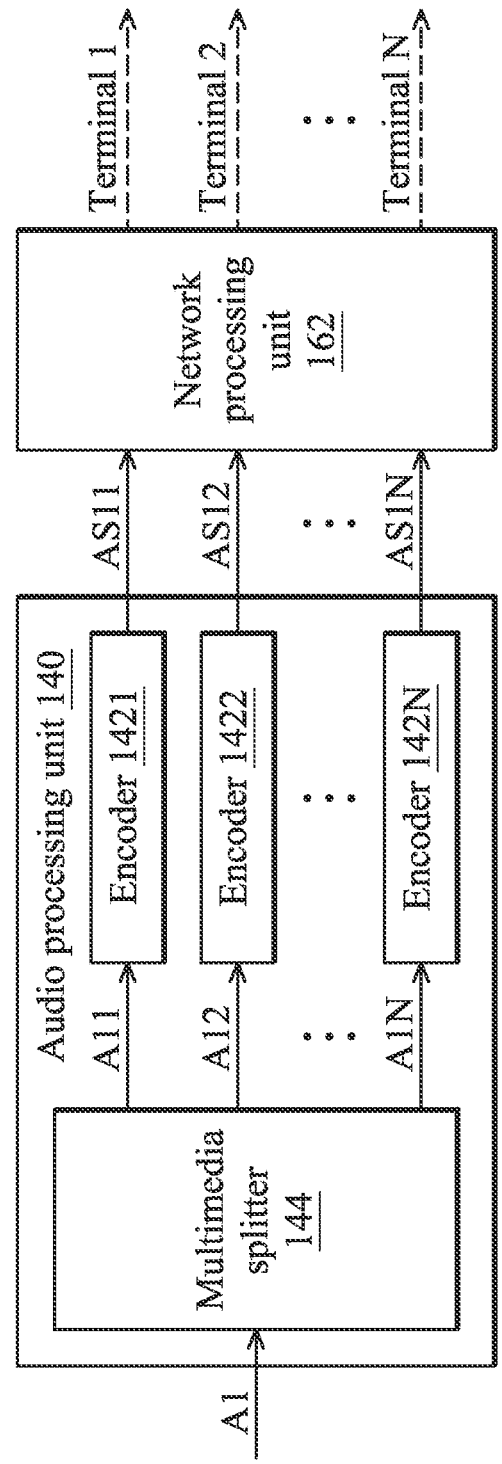
FIG. 3 illustrates a block diagram of the audio processing unit and network processing unit according to an embodiment of the invention.

FIG. 3 illustrates a block diagram of the audio processing unit and network processing unit according to an embodiment of the invention. The audio processing unit 140 includes a multimedia splitter 144 and a plurality of encoders 1421-142N. The multimedia splitter 144 copies the audio signal A1 to produce multi-way audio signals A11-A1N. The encoders 1421-142N encode the multi-way audio signals A11-A1N to audio streams AS11-AS1N, respectively. For the details of the network processing unit 162, reference can be made to the FIG. 1.

Figure 4:
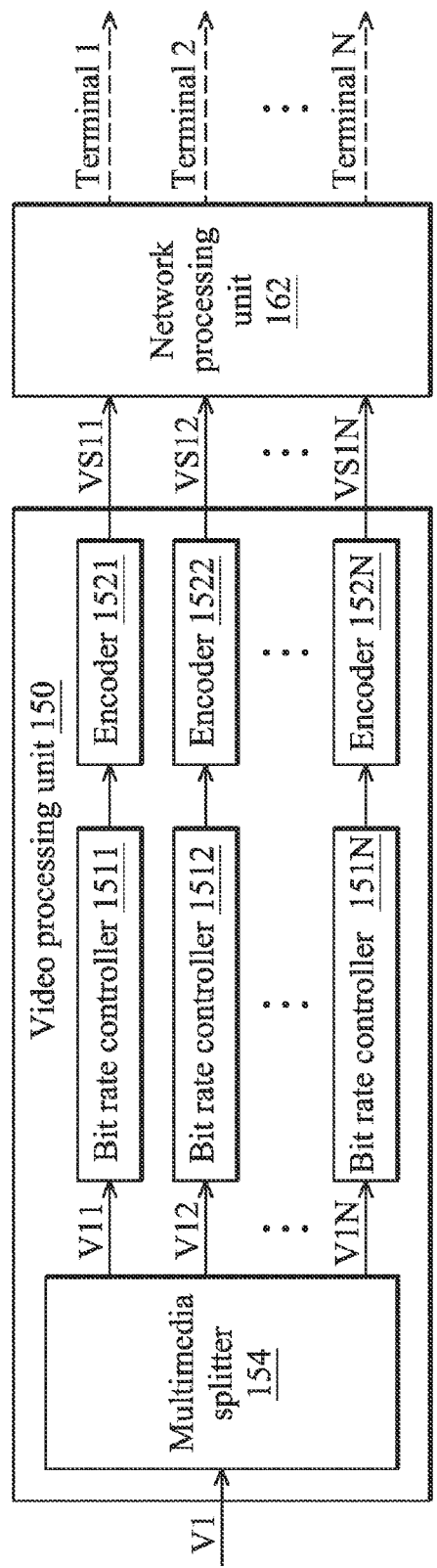
FIG. 4 illustrates a block diagram of the video processing unit and network processing unit according to an embodiment of the invention.

FIG. 4 illustrates a block diagram of the video processing unit and network processing unit according to an embodiment of the invention. The video processing unit 150 includes a multimedia splitter 154, a plurality of bit rate controllers 1511-151N corresponding to the terminals 1-N, and a plurality of encoders 1521-152N. The multimedia splitter 154 copies the video signal V1 to produce a plurality of multi-way video signals V11-V1N according to the number of the terminals. The bit rate controllers 1511-151N control the bit rates of the multi-way video signals V11-V1N, respectively, according to the quality of the connections of the corresponding terminals. For example, the network processing unit 162 may detect the quality of the connections of the other terminals, and provide information of the quality of the connections for the bit rate controllers 1511-151N to control the bit rate. The encoders 1521-152N encode the multi-way video signals V11-V1N to the corresponding video streams VS11-VS1N according to the bit rate controllers 1511-151N. For example, when the quality of the connection between the video conference system 100 and the terminal 1 is better than the quality of the connection between the video conference system 100 and the terminal 2, the bit rate controller 1511 controls the bit rate of the multi-way video signal V11 to be higher than the bit rate of the multi-way video signal V12. Therefore, the encoder 1522 encodes the video stream VS12 according to the bit rate controller 1512, and the bit rate of the video stream VS12 will be less than the bit rate of the video stream VS11 which is encoded by the encoder 1521 according to the bit rate controller 1511. The purpose of the present invention is to utilize the band width efficiently. Therefore, the bit rate control algorithms which can meet the purpose of using the band width efficiently are in the scope of the present invention, and are not limited. For the details of the network processing unit 162, reference can be made to FIG. 1.

Figure 5:
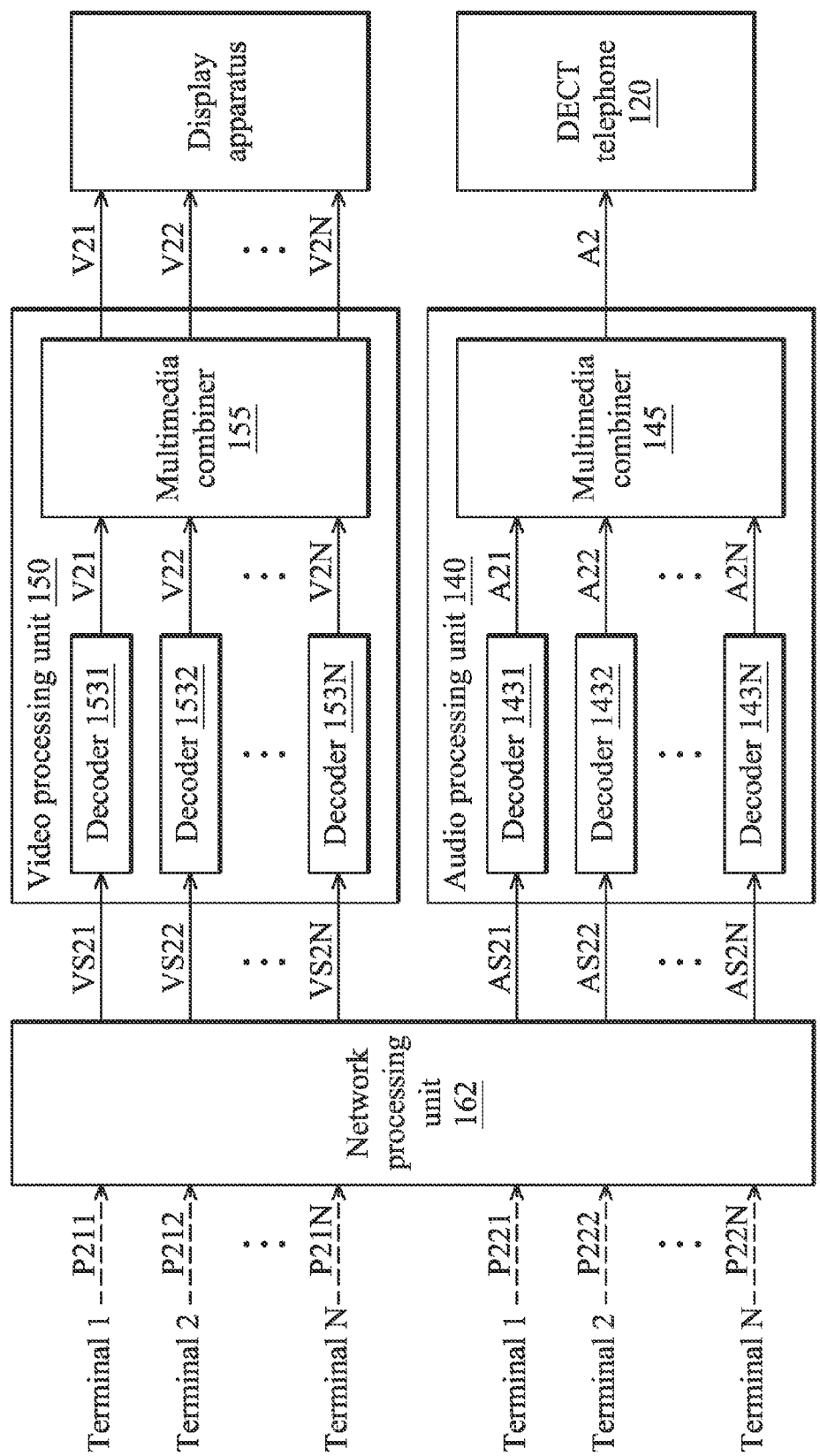
FIG. 5 illustrates a block diagram of the audio processing unit, video processing unit and network processing unit according to an embodiment of the invention.

FIG. 5 illustrates a block diagram of the audio processing unit 140, video processing unit 150 and network processing unit 162 according to an embodiment of the invention. The network processing unit 162 receives the video network packets P211-P21N and the audio network packets P221-P22N corresponding to the terminals 1-N through network, produces a plurality of video streams VS21-VS2N and audio streams AS21-AS2N according to the video network packets P211-P21N and the audio network packets P221-P22N, and transmits the video streams VS21-VS2N and audio streams AS21-AS2N to the video processing unit 150 and the audio processing unit 140, respectively. The audio processing unit 140 includes a multimedia combiner 145 and a plurality of decoders 1431-143N. The video processing unit 150 includes a multimedia combiner 155 and a plurality of decoders 1531-153N. The decoders 1431-143N decode the audio streams AS21-AS2N and produce a plurality of multi-way audio signals A21-A2N, respectively. The multimedia combiner 145 combines the multi-way audio signals A21-A2N to an audio signal A2, and transmits the audio signal A2 to the DECT phone 120 to be displayed. It should be noted that the audio signal A2 can be displayed on the other audio apparatus of the video conference system, but, it is not limited thereto. The decoders 1531-153N decode the video streams VS21-VS2N, and produce a plurality of multi-way video signals V21-V2N. The multimedia combiner 155 transmits the multi-way video signals V21-V2N to the display apparatus, and the display apparatus displays the multi-way video signals V21-V2N. It should be noted that the display apparatus displays a video signal which is composed by the multi-way video signals V21-V2N according to user configuration.

Figure 6:
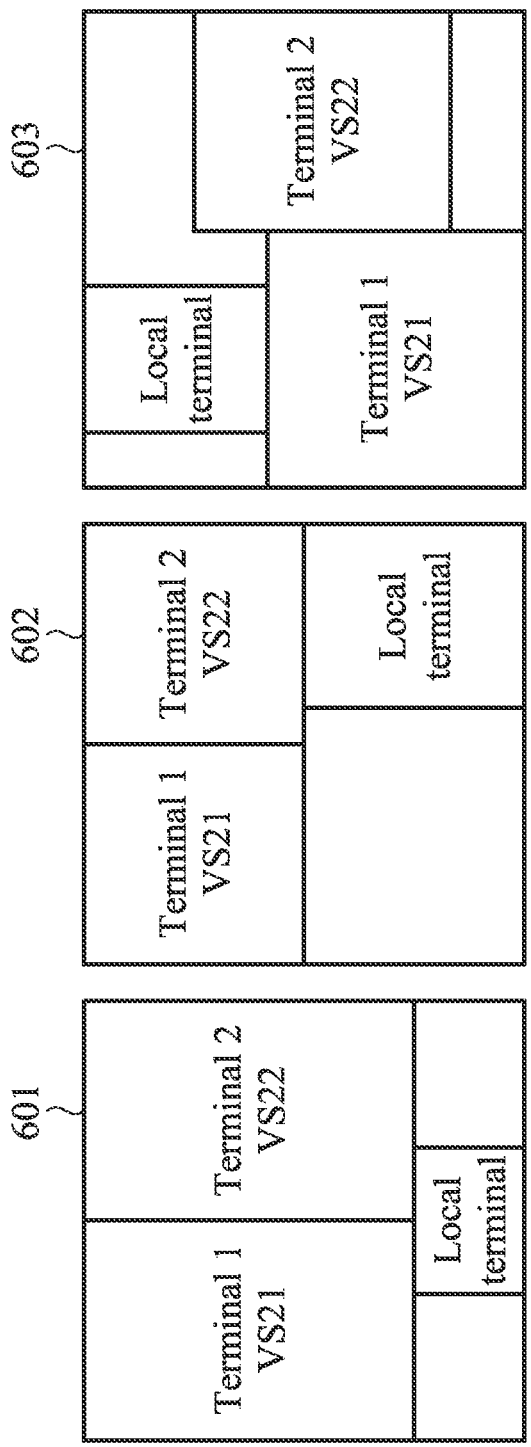
FIG. 6 illustrates a diagram of the user configurations according to a plurality of embodiments of the invention.

The user configurations 601-603 are the different embodiments of the layout of the multi-way video signals when the video conference system 100 is in a three-way conference, as shown in FIG. 6. The users of the three-way conference will receive the multi-way video signals V21-V23 from different terminals. Therefore, the users can select the layout from the user configurations 601-603 to compose the multi-way video signals V21-V23 to produce the video signal V2. It should be noted that the layouts of the present invention are not limited thereto.

Figure 7:
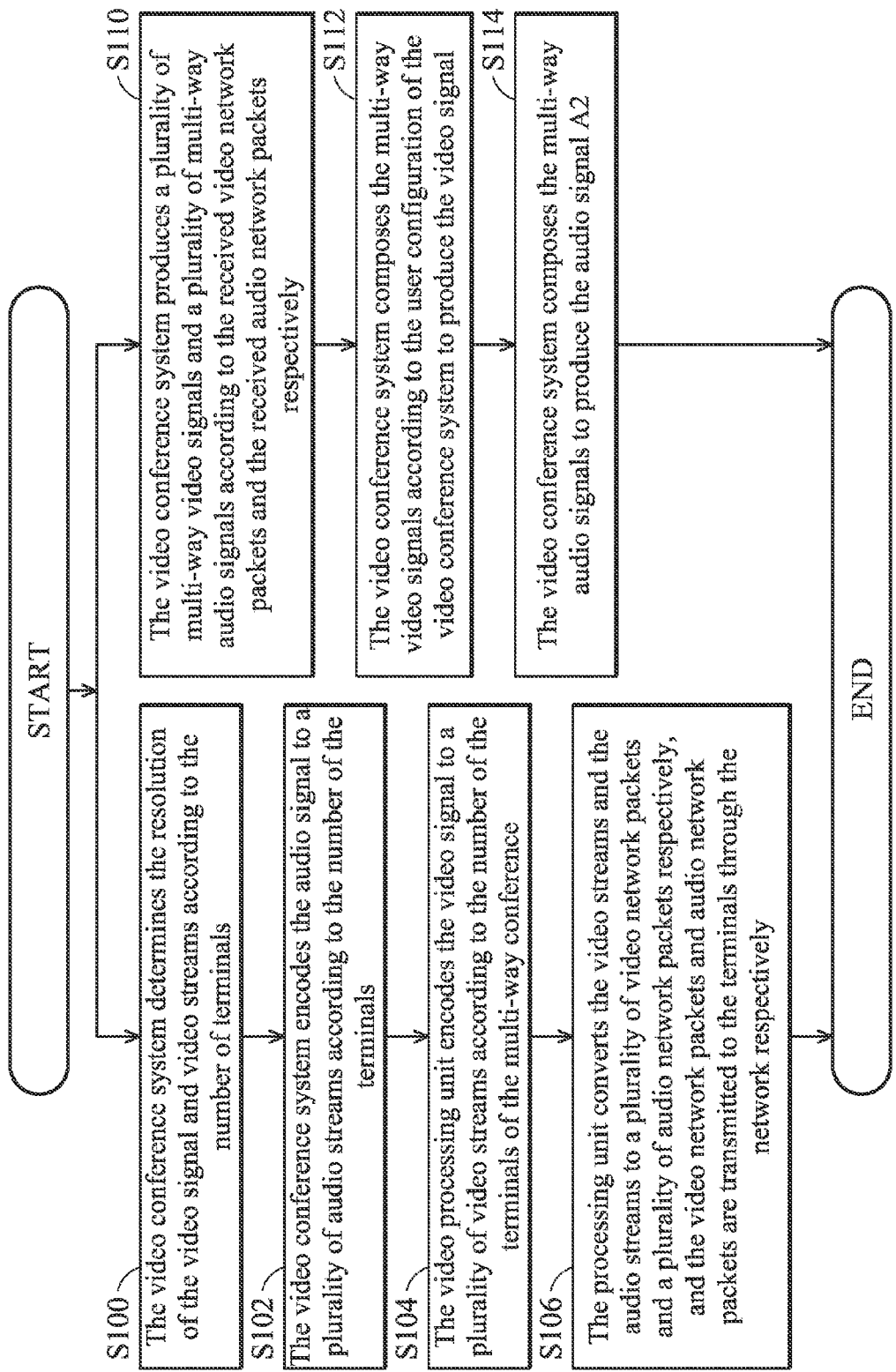
FIG. 7 illustrates a flow chart of the video conference method according to an embodiment of the invention.

FIG. 7 illustrates a flow chart of the video conference method according to an embodiment of the invention, and the video conference method is applied to a video conference system 100 which is in a multi-way conference, wherein the multi-way conference has a plurality of terminals 1-N. The process starts at step S100 and S110.

In the step S100, the video conference system 100 determines the resolution of the video signal V1 and video streams VS11-VS1N according to the number of terminals 1-N.

In the step S102, the video conference system 100 encodes the audio signal A1 which is captured by the sound receiver according to the number of the terminals 1-N. The audio processing unit 140 copies the audio signal A1 to produce a plurality of multi-way audio signals A11-A1N, and the audio processing unit 140 encodes the multi-way audio signals A11-A1N to a plurality of corresponding audio streams AS11-AS1N.

Next, in the step S104, the video processing unit 150 encodes the video signal V1 to a plurality of video streams VS11-VS1N according to the number of the terminals of the multi-way conference. Namely, the video processing unit 150 copies the video signal V1 to produce a plurality of multi-way video signals V11-V1N according to the number of the terminals of the multi-way conference, and the video conference system 100 controls the bit rates of the multi-way video signals V11-V1N according to the quality of the connections of the corresponding terminals 1-N. Finally, the video processing unit 150 encodes the multi-way video signals V11-V1N to the video streams VS1-VSN according to the bit rates of the multi-way video signals V11-V1N, respectively.

Next, in the step S106, the audio processing unit 140 converts the video streams VS11-VS1N and the audio streams AS11-AS1N to a plurality of video network packets P111-P11N and a plurality of audio network packets P121-P12N, respectively, and the video network packets P111-P11N and audio network packets P121-P12N are transmitted to the terminals 1-N through the network, respectively. The process ends at the step S106.

In the step S110, the video conference system 100 produces a plurality of multi-way video signals V21-V2N and a plurality of multi-way audio signals A21-A2N according to the received video network packets P211-P21N and the received audio network packets P221-P22N, respectively.

Next, in the step S112, the video conference system 100 composes the multi-way video signals V21-V2N according to the user configuration of the video conference system 100 to produce the video signal V2.

Next, in the step S114, the video conference system 100 composes the multi-way audio signals A21-A2N to produce the audio signal A2. The process ends at the step S114.

Figure 8:
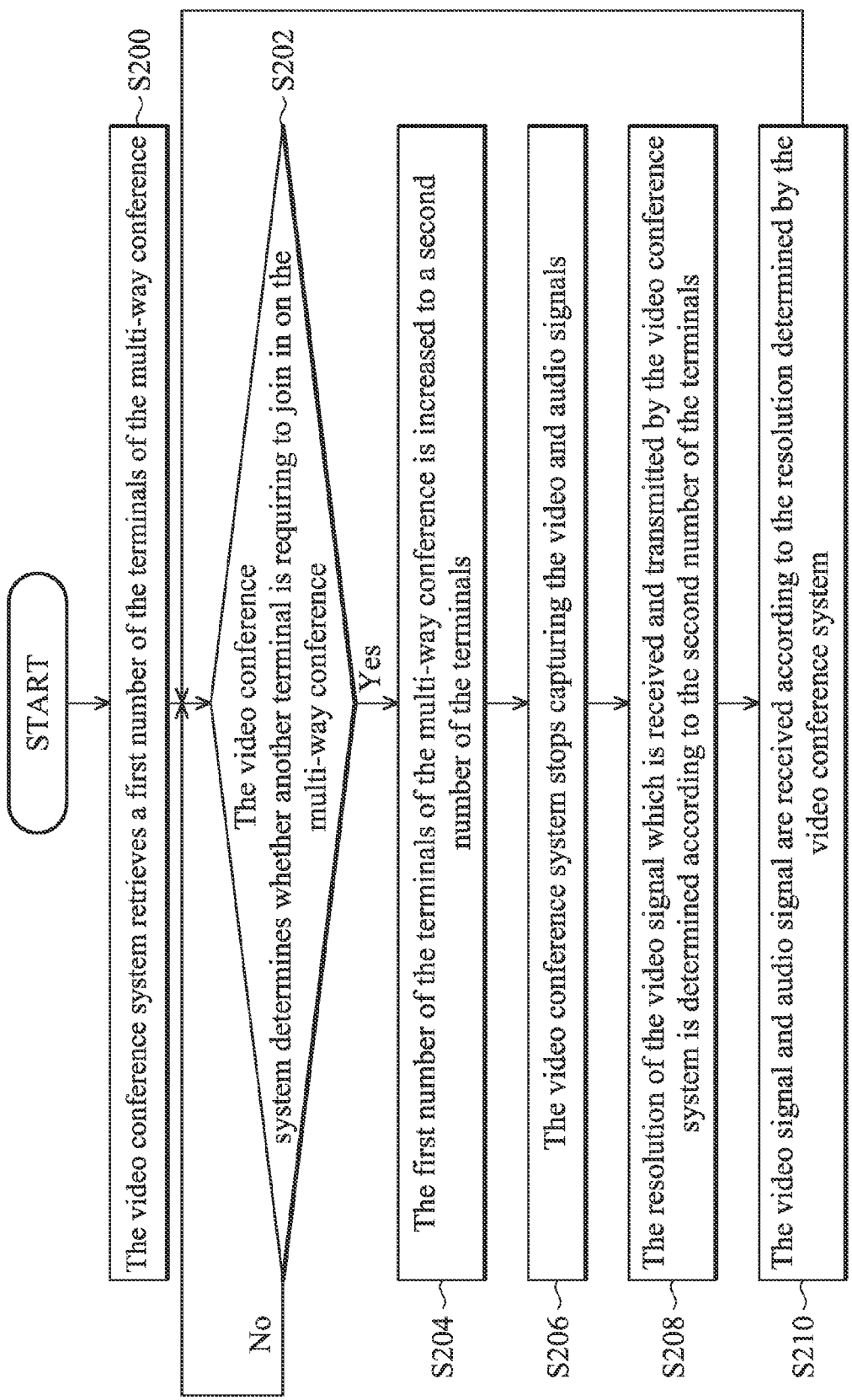
FIG. 8 illustrates a flow chart of the video conference method according to an embodiment of the invention.

FIG. 8 illustrates a flow chart of the video conference method according to an embodiment of the invention, wherein the video conference method is applied to a video conference system 100 which is in a multi-way conference. The process starts at step S200.

In the step S200, the video conference system 100 retrieves a first number of the terminals of the multi-way conference. For example, the video conference system 100 may store the number of the terminals of the multi-way conference in a flag, such that the video conference system 100 can retrieve the number of the terminals of the multi-way conference from the flag.

Next, in the step S202, the video conference system 100 determines whether another terminal is requiring to join in on the multi-way conference. When another terminal is requiring to join in on the multi-way conference, the process goes to step S204; otherwise, the video conference system 100 continues to determine whether another terminal is requiring to join in on the multi-way conference.

Next, in the step S204, when another terminal is requiring to join in on the multi-way conference, the first number of the terminals of the multi-way conference is increased to a second number of the terminals. For example, when there are two terminals requiring to join in on the multi-way conference, 2 is added to the first number of the terminals of the multi-way conference, and the new total becomes the second number of the terminals.

Next, in the step S206, the video conference system 100 stops capturing the video and audio signals.

Next, in the step S208, the resolution of the video signal which is received and transmitted by the video conference system 100 is determined according to the second number of the terminals. For example, when the video conference system 100 is in a two-way conference, the resolution of the video signal V1 and the video streams VS11-VS12 may be 720 P, when the video conference system 100 is in a three-way conference, the resolution of the video signal V1 and the video streams VS11-VS13 may be VGA, when the video conference system 100 is in a four-way conference, the resolution of the video signal V1 and the video streams VS11-VS14 may be 360 P, and so on.

Next, in the step S210, the video signal and audio signal are received according to the resolution determined by the video conference system 100. Next, the process goes back to step S202.

Figure 9:
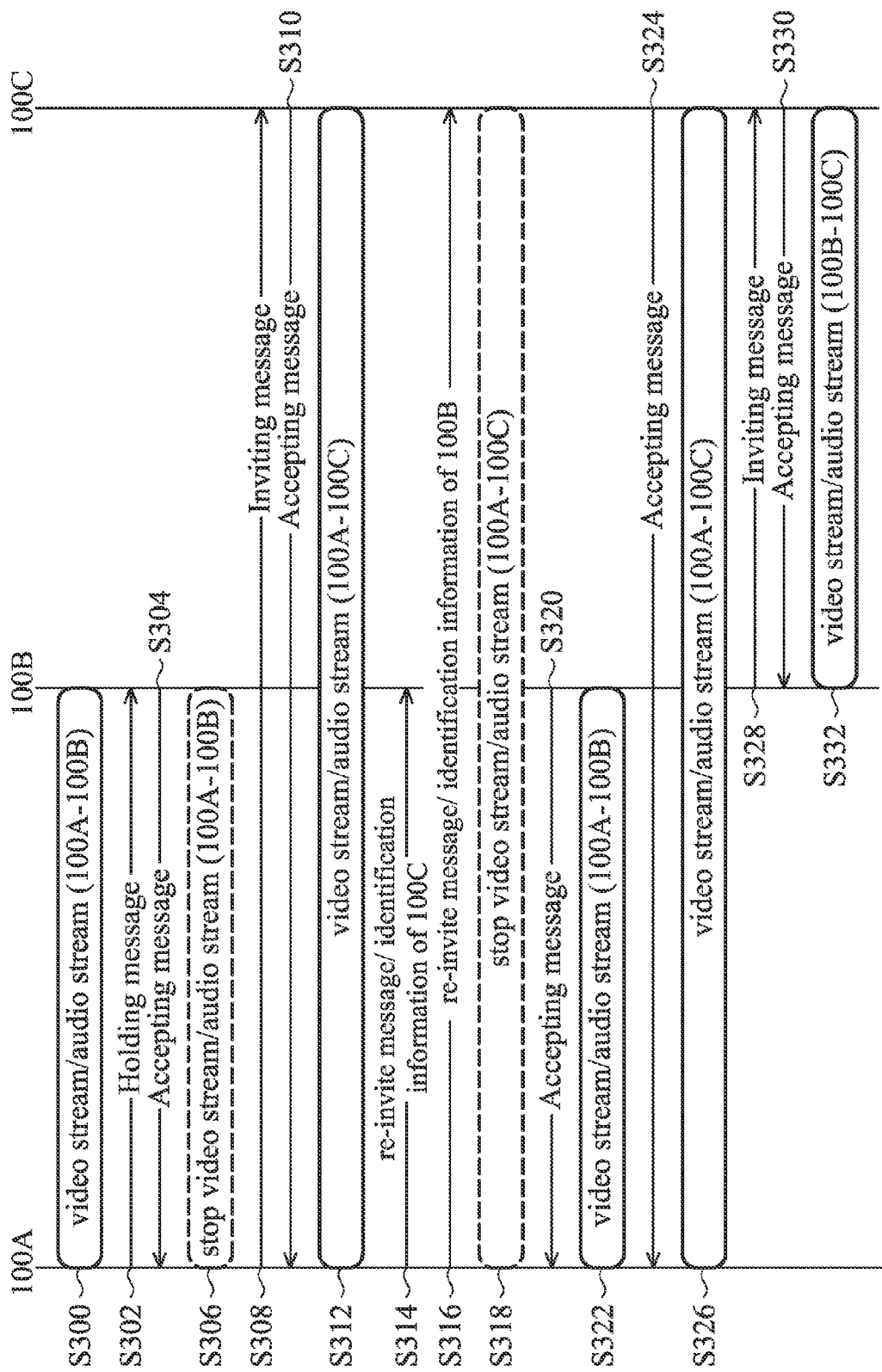
FIG. 9 illustrates a signal flow chart of the multi-way conference according to an embodiment of the invention.

FIG. 9 illustrates a signal flow chart of the multi-way conference according to an embodiment of the invention, wherein the signal flow chart of the multi-way conference is applied to create a three-way conference. The process starts at step S300.

In the step S300, the video conference system 100A and the video conference system 100B are in a conference, and exchanging video and audio streams.

Next, in the step S302, the video conference system 100A sends a holding message to the video conference system 100B for holding the conference.

Next, in the step S304, the video conference system 100B sends an accepting message to the video conference system 100A for responding to the holding message.

Next, in the step S306, the video conference system 100A and the video conference system 100B stop exchanging video and audio streams.

Next, in the step S308, the video conference system 100A sends an inviting message to the video conference system 100C for activating a conference.

Next, in the step S310, the video conference system 100C sends an accepting message to the video conference system 100A for responding to the inviting message.

Next, in the step S312, the video conference system 100C and the video conference system 100A start exchanging video and audio streams.

Next, in the step S314, the video conference system 100A sends a re-invite message and identification information of the video conference system 100C to the video conference system 100B. It should be noted that the video conference system 100B can make a call to the video conference system 100C according to the identification information of the video conference system 100C. For example, identification information of the video conference system 100C can be the phone number or the IP address.

Next, in the step S316, the video conference system 100A sends a re-invite message and identification information of the video conference system 100B to the video conference system 100C. It should be noted that the video conference system 100C can make a call to the video conference system 100B according to the identification information of the video conference system 100B. For example, identification information of the video conference system 100B can be the phone number or the IP address.

Next, in the step S318, the video conference system 100A and video conference system 100C stop exchanging video and audio streams.

Next, in the step S320, the video conference system 100B sends an accepting message to the video conference system 100A for responding to the re-invite message.

Next, in the step S322, the video conference system 100B and the video conference system 100A start exchanging video and audio streams.

Next, in the step S324, the video conference system 100C sends an accepting message to the video conference system 100A for responding to the re-invite message.

Next, in the step S326, the video conference system 100C and the video conference system 100A start exchanging video and audio streams.

Next, in the step S328, the video conference system 100B sends an inviting message to the video conference system 100C for an invitation.

Next, in the step S330, the video conference system 100C sends an accepting message to the video conference system 100B for responding to the invitation message.

Next, in the step S332, the video conference system 100C and the video conference system 100B start exchanging video and audio streams. The process creates the three-way conference and ends at the step S332.

Figure 10:
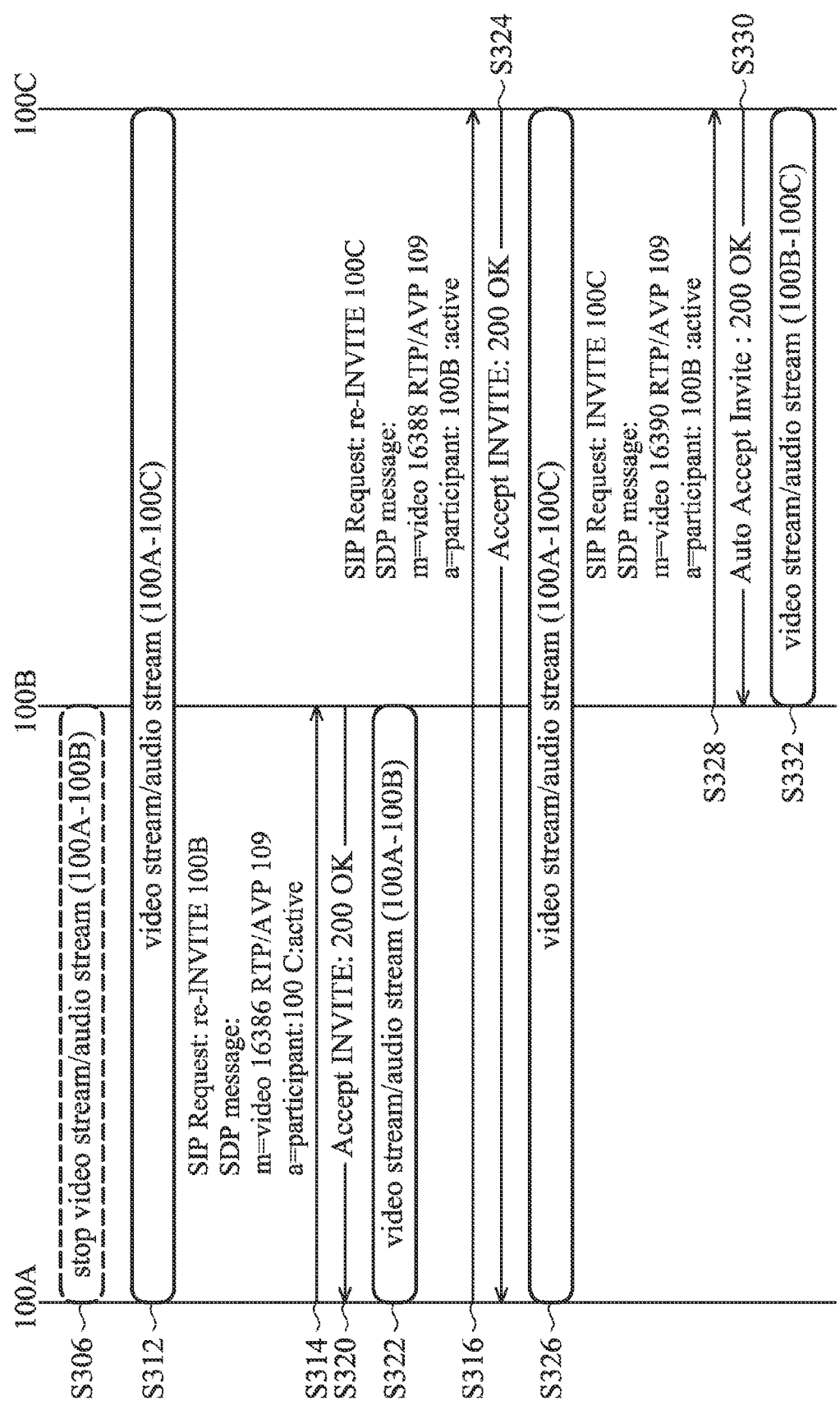
FIG. 10 illustrates a signal flow chart of the multi-way conference according to an embodiment of the invention.

FIG. 10 illustrates a signal flow chart of the multi-way conference according to an embodiment of the invention, wherein the signal flow chart of the multi-way conference is applied to a three-way conference. The process of FIG. 10 is similar with the process of FIG. 9 except that every step of FIG. 10 includes a message of a session initiation protocol (SIP) and a message of a session description protocol (SDP), as shown. The SIP is a peer-to-peer protocol, and the SIP only requires a simple network, which can highly extend, to deliver works to the terminals through the network. The SIP protocol can work with the SDP protocol, wherein the SDP protocol is used to describe details of the media stream, such as which of the IP port or the encoder is required. Additionally, the process of FIG. 10 starts at step S306 and eliminates the steps S308-S310 and step S318 of FIG. 9.

For those skilled in the art, it should be appreciated that the aforementioned embodiments in the invention describe different ways of implementation, and the each way of implementation of the video conference system and the video conference terminal apparatus can be collocated for usage. The video conference system 100 in the invention may use the video conference terminal apparatus and a common DECT telephone with an image capturing unit to conduct a video conference with other users, thereby having convenience and cost advantages.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video conference system, applied to create a plurality of channels coupled to each of a plurality of terminals of a multi-way conference in a network, respectively, comprising:
   an audio processing unit, configured to encode a first audio signal to a plurality of first audio streams according to a number of the terminals of the multi-way conference;
   a video processing unit, configured to encode a first video signal received by a multimedia capturing unit to a plurality of first video streams according to the number of the terminals of the multi-way conference; and
   a network processing unit, configured to convert the plurality of first audio streams and the plurality of first video streams to a plurality of first video network packets and a plurality of first audio network packets, respectively, and transmitting the plurality of first video network packets and the plurality of first audio network packets to the plurality of terminals through the network wherein when the network processing unit receives a plurality of second video network packets and a plurality of second audio network packets corresponding to the plurality of terminals through the network, the network processing unit produces a plurality of second video streams and a plurality of second audio streams according to the plurality of second video network packets and the plurality of second audio network packets, respectively, and forces the plurality of second video streams and the plurality of second audio streams to be displayed on a display apparatus and an audio apparatus simultaneously; wherein the video processing unit comprises a multimedia splitter configured to copy the first video signal to produce a plurality of multi-way video signals according to the number of the terminals of the multi-way conference and the video processing unit further comprises a plurality of bit rate controllers configured to control bit rates of the plurality of multi-way video signals.

2. The video conference system as claimed in claim 1, wherein the audio processing unit comprises a multimedia splitter configured to copy the first audio signal to produce a plurality of multi-way audio signals according to the number of the terminals of the multi-way conference.

3. The video conference system as claimed in claim 2, wherein the audio processing unit further comprises a plurality of encoders configured to encode the plurality of multi-way audio signals to the plurality of audio streams.

4. The video conference system as claimed in claim 1, wherein the video processing unit further comprises a plurality of encoders configured to encode the plurality of multi-way video signals to the plurality of video streams according to the plurality of bit rate controllers.

5. The video conference system as claimed in claim 1, wherein the multimedia capturing unit and the video processing unit are further configured to determine a resolution of the first video signal and the plurality of video streams according to the number of the terminals of the multi-way conference.

6. The video conference system as claimed in claim 1, wherein each of the video processing unit and the audio processing unit comprises a plurality of decoders configured to decode the plurality of second video streams and the plurality of second audio streams to produce a plurality of second multi-way video signals and a plurality of second multi-way audio signals.

7. The video conference system as claimed in claim 6, wherein each of the video processing unit and the audio processing unit comprises a multimedia combiner configured to transmit the plurality of second multi-way video signals to a display apparatus and combine the plurality of second multi-way audio signals to a second audio signal, wherein the display apparatus is configured to display a second video signal composed of the plurality of second multi-way video signals according to a user configuration.

8. A video conference method, applied to a video conference system, wherein the video conference system is configured to create a plurality of channels coupled to each of a plurality of terminals of a multi-way conference in a network, respectively, the video conference method comprising:
   encoding a first audio signal to a plurality of first audio streams according to a number of the terminals of the multi-way conference; encoding a first video signal captured by a multimedia capturing unit to a plurality of first video streams according to the number of the terminals of the multi-way conference;
   converting the plurality of first audio streams and the plurality of first video streams to a plurality of first video network packets and a plurality of first audio network packets, respectively, and transmitting the plurality of first video network packets and the plurality of first audio network packets to the plurality of terminals through the network;
   receiving a plurality of second video network packets and a plurality of second audio network packets corresponding to the plurality of terminals;
   producing a plurality of second multi-way video signals and a plurality of second multi-way audio signals according to the plurality of second video network packets and the plurality of second audio network forcing the plurality of second multi-way video signals and the plurality of second multi-way audio signals to be displayed on a display apparatus and an audio apparatus simultaneously; wherein the video conference system having a video processing unit comprises a multimedia splitter configured to copy the first video signal to produce a plurality of multi-way video signals according to the number of the terminals of the multi-way conference and the video processing unit further comprises a plurality of bit rate controllers configured to control bit rates of the plurality of multi-way video signals.

9. The video conference method as claimed in claim 8, wherein the step of encoding the first audio signal to the plurality of first audio streams according to the number of the terminals of the multi-way conference further comprises:
   copying the first audio signal to produce a plurality of multi-way audio signals according to the number of the terminals of the multi-way conference; and
   encoding the plurality of multi-way audio signals to the plurality of audio streams.

10. The video conference method as claimed in claim 8, wherein the step of encoding the first video signal captured by the multimedia capturing unit to the plurality of first video streams according to the number of the terminals of the multi-way conference further comprises:
   copying the first video signal to produce a plurality of multi-way video signals according to the number of the terminals of the multi-way conference; and
   controlling bit rates of the plurality of multi-way video signals according to the plurality of multi-way video signals.

11. The video conference method as claimed in claim 8, further comprising determining a resolution of the first video signal and the plurality of video streams according to the number of the terminals of the multi-way conference.

12. The video conference method as claimed in claim 8, wherein the step of forcing the plurality of second multi-way video signals and the plurality of second multi-way audio signals to be displayed on the display apparatus and the audio apparatus simultaneously further comprises:
   displaying a second video signal composed of the plurality of second multi-way video signals according to a user configuration; and
   combining the second multi-way audio signals to a second audio signal.

* * * * *